May 4, 1954 B. CALVERT 2,677,287
HYDRAULIC VARIABLE TRANSMISSION
Filed April 21, 1950 3 Sheets-Sheet 1

BERT CALVERT,
INVENTOR.

BY [signature]

ATTORNEY

BERT CALVERT,
INVENTOR.

BY *Francis D. Ammen*

ATTORNEY

BERT CALVERT,
INVENTOR.

ATTORNEY

Patented May 4, 1954

2,677,287

UNITED STATES PATENT OFFICE 2,677,287

HYDRAULIC VARIABLE TRANSMISSION

Bert Calvert, Los Angeles, Calif.

Application April 21, 1950, Serial No. 157,211

5 Claims. (Cl. 74—677)

This invention relates to a variable ratio transmission apparatus, and one of the objects of the invention is to provide a transmission mechanism which will operate when the drive starts, to impart the driving torque to the driven part or driven-shaft at a speed reduced in relation to the driving part or driving shaft, and as the drive continues, the transmission mechanism, after effecting some acceleration of the driven-shaft, will operate to vary the driving ratio by increasing the same toward a one-to-one drive ratio. This is accomplished through the medium of impellers operating upon a liquid medium.

While this transmisison may be employed in any situation where a driven load is to be driven and accelerated through reduction apparatus between a driving shaft and a driven shaft, it is particularly useful when employed as a transmission apparatus in vehicles such as automobiles and trucks, or the like.

In its preferred form the apparatus includes a planetary mechanism which operates when the drive commences, to transmit torque from the driving shaft to the driven shaft at reduced speed. One of the objects of the invention is to include with this planetary mechanism, impeller elements operating on the liquid medium in such a way as to gradually increase the driving ratio and advance the same from a reduction drive up to a one-to-one drive ratio, which the apparatus will automatically establish.

Another object in the invention is to combine with this apparatus means for holding one of the elements of the planetary mechanism, so that it will operate as the reactor, or fixed member in the planetary drive, while the driving is being effected at a reduced ratio, but which will operate in such a way that as the drive speeds up, to gradually increase the drive ratio and finally effect a drive at a one-to-one ratio. The planetary mechanism referred to includes a sun-gear about which planetary gears rotate when the drive through the mechanism is initiated. When this drive is initiated, the sun-gear is stationary, as a result of which, drive is effected through the carrier or "spider" that carries the planetary gears, to drive the same at reduced speed, that is to say, at a less number of revolutions per minute than is imparted to the mechanism by the driving shaft; and one of the objects of my invention is to provide improved hydraulic means, including two or more impellers, having a correlated construction enabling them to effect an acceleration of the sun-gear up to the R. P. M. of the "spider" carrying the planetary gears at which movement the one-to-one drive ratio is established.

Further objects of the invention will appear hereinafter.

The invention consists in the novel elements and combination of elements to be described hereinafter, all of which contribute to produce an efficient hydraulic variable transmission.

A preferred embodiment of the invention is described in the following specification, while the broad scope of the invention is pointed out in the appended claims.

Figure 4:
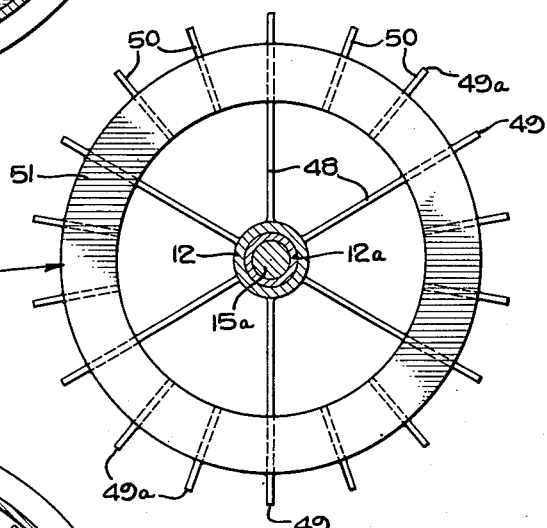

Figure 4 is a side elevation of the secondary impeller. This view represents this impeller as it would be seen if the impeller assembly were removed from the housing that encases it, but this view, for the sake of clearness, does not show the primary impeller, which would be located back of the secondary impeller. However, this view shows the hub of the secondary impeller, and the bushing that separates the same from the driven-shaft, and also shows the driven-shaft in cross section.

Figure 1:
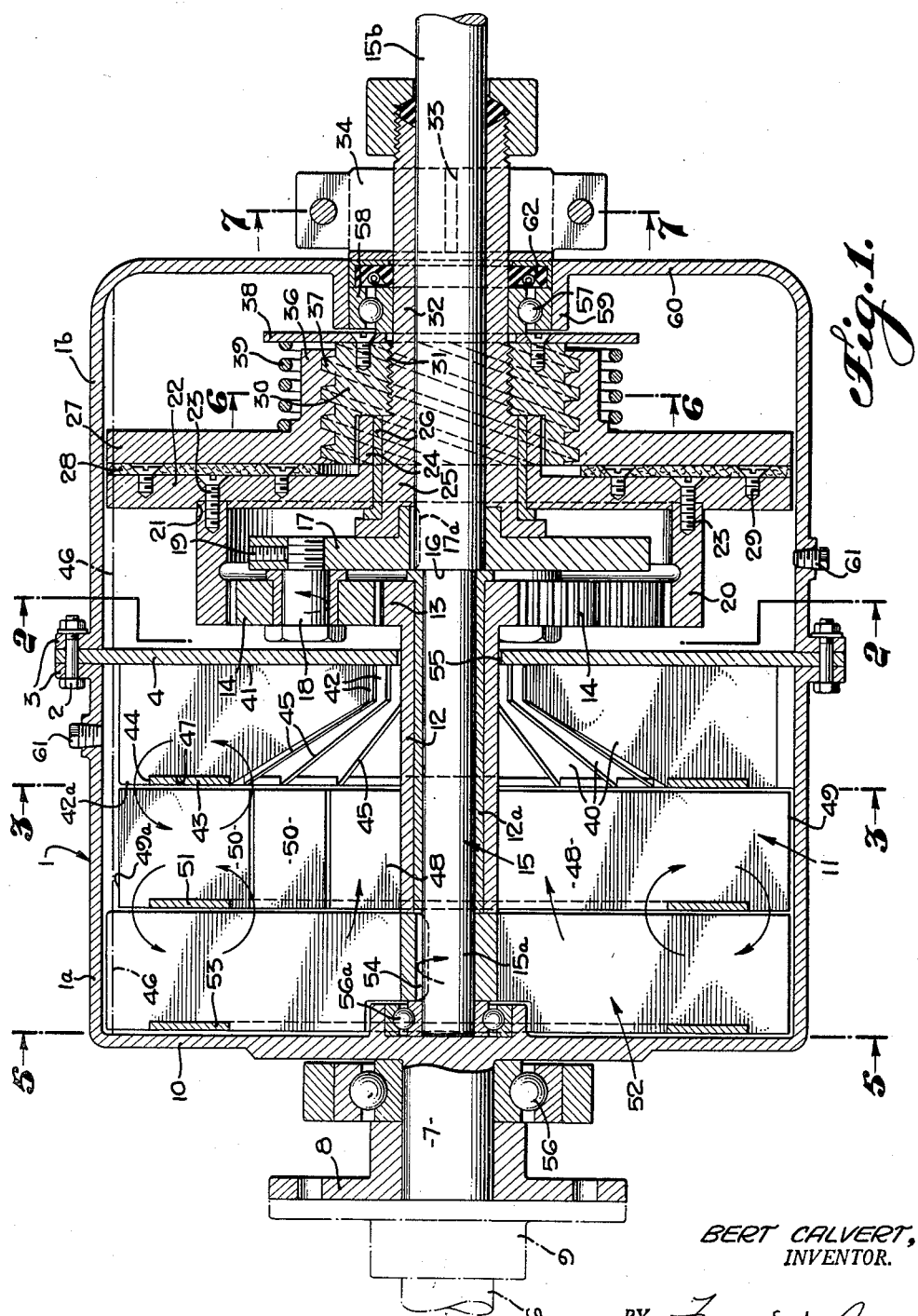
Figure 1 is a longitudinal section through my transmission apparatus and along its axis, the end of the driven-shaft being broken away; and at the other end of the apparatus, the driving shaft and its coupling to the apparatus is indicated in broken lines. This section is taken on the line 1—1 of Fig. 3, looking towards the left, passing through the axis of the driven-shaft.
Figure 5:
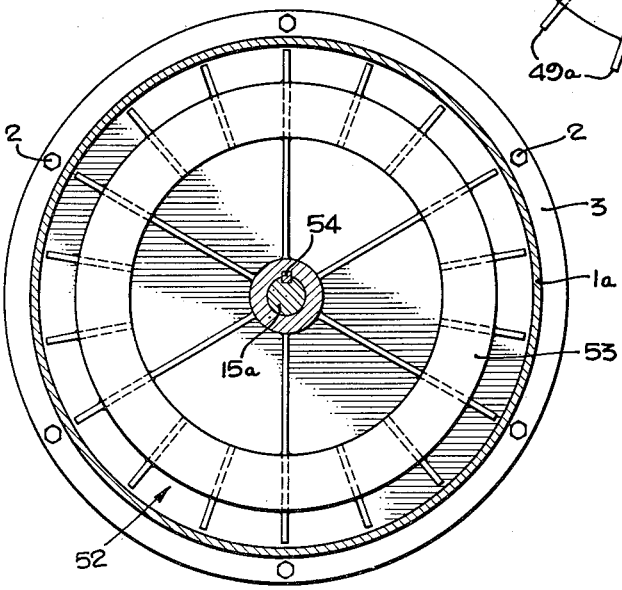

Figure 5 is a vertical cross section taken on the line 5—5 of Fig. 1 and particularly illustrating the third, or tertiary impeller. In this view the housing, or casing, of the apparatus is shown in section to indicate the relation of the diameter of the secondary and third impeller to the inside diameter of the housing or casing that confines the liquid in which the impellers operate.

Figure 6:
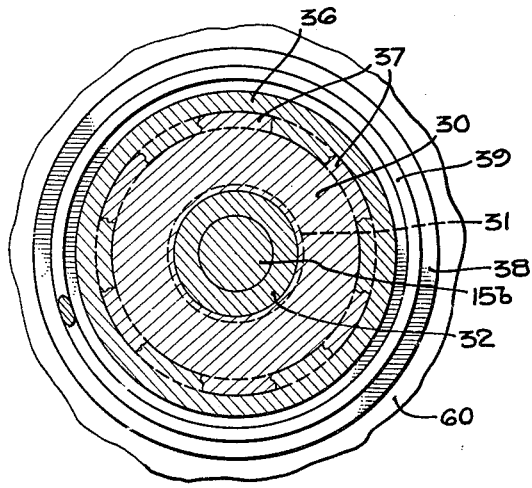

Figure 6 is a fragmentary view, and is a cross section taken about on the line 6—6 of Fig. 1, and particularly illustrating further details of the automatic brake device that operates to hold the reactor gear of the planetary mechanism.

Figure 7:
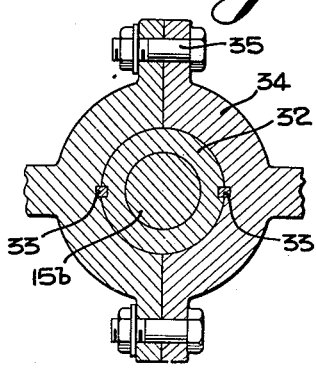

Figure 7 is a vertical section taken on the line 7—7 of Fig. 1 and illustrating the means employed for supporting the rear end of the driven-shaft and providing a bearing for same.

Referring more particularly to the parts, the transmission mechanism is preferably carried in a tubular housing or drum 1 that includes a part 1a in which the impellers are housed, and a part 1b in which the planetary mechanism is housed. In other words, in the present illustration these two parts, 1a and 1b, are attached together by bolts 2 passing through their flanges 3 between which the disc or transverse head 4 of the primary impeller 5 is secured.

It should be understood that in the present embodiment of this invention, the entire housing 1 is rotated through the agency of a driving part such as the drive shaft 6, shown in broken lines at the left of Fig. 1, which drives the stub shaft 7 of the section or part 1a of the housing through a flange coupling 8 that is rigid with or keyed to the stub shaft 7. This coupling 8, of course, co-operates with a similar flanged coupling 9 that is rigid with or keyed to the driving shaft 6. The stub shaft 7 may be formed as a separate piece from section 1a but in the present instance, for the sake of simplicity, it is illustrated as being integral with the adjacent head 10 of this part.

The secondary impeller 11 is formed at the end of a long sleeve 12, the inner end of which is formed into a sun-gear 13, and the bore of this long sleeve or hub for the secondary impeller carries a bushing 12a that fits to the inner shaft 15, which shaft is the driven-shaft and includes a forward section 15a and a rear section 15b. At the junction point of these two sections, 15a and 15b, a shoulder 16 is formed against which a flanged end of the sleeve 12a abuts, as indicated in the drawing.

Figure 2:
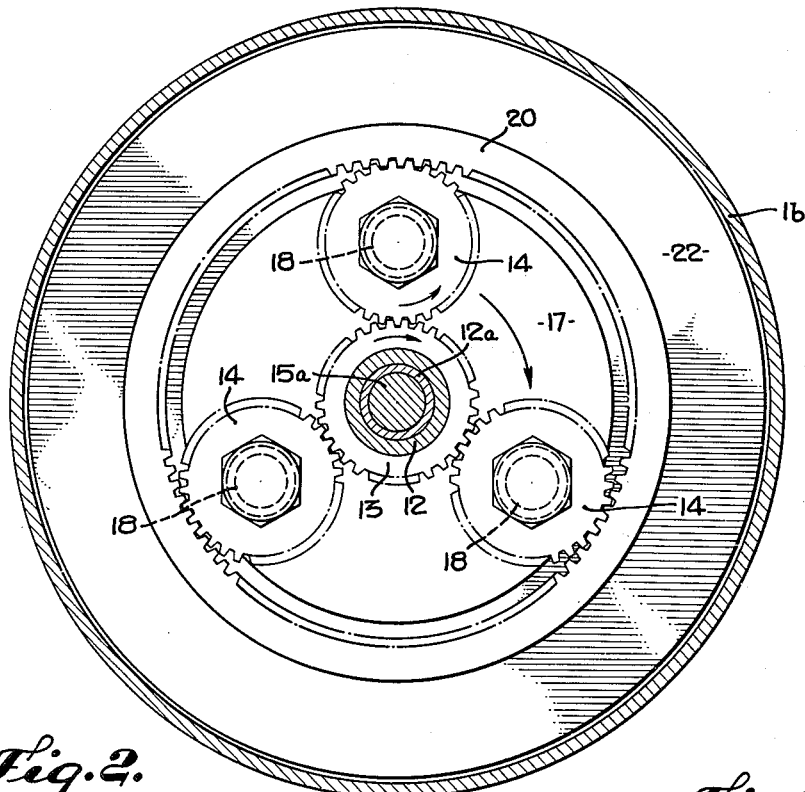
Figure 2 is a vertical section taken about on the line 2—2 of Fig. 1 and particularly illustrating the planetary driving mechanism.

As indicated in Fig. 2, the sun-gear 13 meshes with three planetary gears 14, the diameter of which will depend upon the desired initial drive ratio of reduction of drive through the planetary to the driven-shaft 15. Furthermore, there may be more or less than three of the planetary gears. However, I prefer to employ three, spaced 120 degrees apart, and all of these planetary gears are mounted for free rotation on a carrier or spider 17. For this purpose bushed studs 18 may be employed, the inner ends of which have reduced threaded tips mounted in threaded sockets in the spider, and set screws, such as the set screw 19, may be employed for insuring that these studs 18 or stub shafts will not work lose. However, as the direction of rotation of these planetary gears on their studs or shafts 18 is always in one direction, i. e. the forward direction, it is possible to have the reduced threaded ends of the studs of a character such that any friction on the studs exerted by the planetary gears or their bushings will be in a direction to tighten the studs instead of to loosen them.

At their outer edges the planetary gears 14 mesh with the teeth of an internal gear 20, which is the reactor member of the planetary mechanism, and this gear is in the form of a long ring, the rear edge of which is counter-sunk into an annular socket 21 formed in the face of a large brake-disc 22, and to which it is attached by suitable fasteners, such as machine screws 23. And this disc 22 has a hub 24, which is freely rotatable at a traveler bearing 25, and with a suitable bushing 26.

This reactor gear 20 is normally held in a fixed position through the agency of a disc 27, the adjacent face of which is normally held in contact with a brake lining 28 that is secured on the adjacent face of the brake disc 22 by any suitable means, such as small counter-sunk machine screws 29.

Through the agency of a thread connection, the brake disc 27 is automatically controlled so that if the driven-shaft 15 rotates in reverse direction with respect to the driving shaft, then the traveller 27 will back off from the brake lining 28. In order to accomplish this, I provide an externally threaded ring 30. The ring 30 is also provided with a threaded bore which is received on screw threads 31 on a fixed long tubular sleeve 32 (see Fig. 7), which illustrates how this sleeve is provided with two keys 33 that hold it against rotation in a split clamp 34, the two sections of which are flanged and secured together by bolts 35 passing through their flanges. The inner end of the ring 30 has a counter-bore as shown at its inner end to form a recess to receive a hub 24 of the brake disc 22 and the bottom of this counter-bore may seat against the end of the hub 24 as illustrated.

The traveller 27 has a hub 36, which has an internal thread to receive the external thread 37 on the ring 30. This is high-pitched thread and is preferably a stout double or quadruple thread. The reason why this thread should be high-pitched will be explained hereinafter. To the outer end of the ring 30 a spring seat 38 is secured by small machine screws as shown, and this spring seat is in the form of a disc against which the end of a coil spring 39 seats. The other end of this spring presses against the outer face of the traveller disc 27, so as to bias it toward the brake lining 28.

The character of the thread connection at the thread 37 is such that the thrust of the planetary gears 14 on the ring 20 will urge the ring 20 to rotate in the direction that will cause the friction of the brake lining 28 on the traveller 27 to move the traveller toward the lining 28 and press the traveller disc 27 firmly against the lining. In other words, if the thrust of the planetary gears 14 on the ring 20 urges the ring to rotate in anti-clockwise direction, as viewed in Fig. 2, then the thread 37 should be a right hand thread so that the friction contact between the brake lining 28 and the face of the disc 27 would turn the traveller 27 in an anti-clockwise direction, which would move the traveller toward the brake disc 22. This movement is assisted by the spring 39. If, however, the thrust of the planetary gears were in the opposite direction, then the friction of the lining 28 against the disc 27 would rotate the hub 36 in a direction to move the traveller away from the brake lining 28, this would permit the brake disc and the ring 20 to rotate freely. In other words, it would inhibit the holding action that the brake disc 22 would normally have while forward drive through the transmission was taking place. In other words, if the driving shaft 15 were rotated in a reverse direction from that which it has when a forward drive is taking place, then the brake disc 22 would automatically release itself. The advantages derived from this mode of operation will be explained more in detail at another point in this specification.

I shall now proceed to describe the impellers, their co-action with each other, and how they function to build up the drive from a reduction drive to a one to one ratio as the speed ratio of the driving shaft 6 increases.

Figure 3:
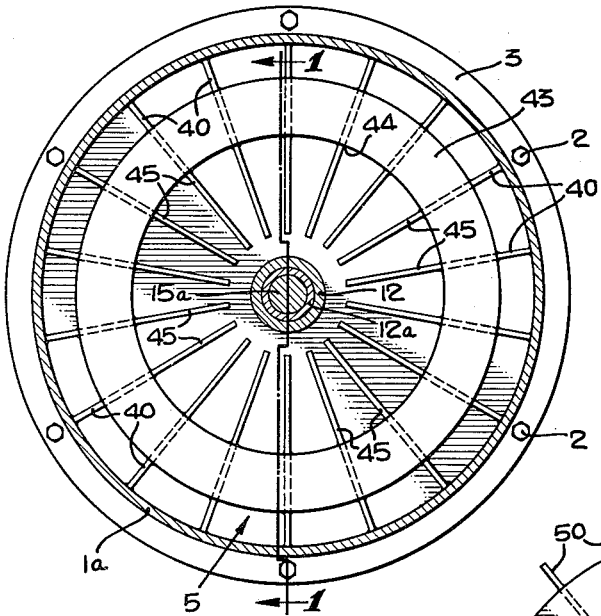
Figure 3 is a vertical cross section taken about on the line 3—3 of Fig. 1, and passing in a plane that is between the primary impeller and the secondary impeller that is accelerated through the agency of the liquid medium in which the impellers rotate. This view particularly illustrates the preferred features of construction of the primary impeller.

Referring now to Figs. 1 and 3, the primary impeller comprises a plurality of substantially radial vanes 40 of plate form, the outer ends of which are secured to the inner face of the drum-form casing section 1-a, preferably by welds. Their rear edges 41 rest against the adjacent face of partition head or wall 4. These vanes should be stiff enough to insure that they will not become deflected by the lateral pressure of the liquid upon them. If desired, they can be made of comparatively small gage metal if their edges are set in radial grooves (not illustrated) in the plate 4.

Their inner edges 42 are preferably spaced a short distance from the side of the sleeve 12. Their forward edges 42-a carry an annular baffle 43 in the form of a ring of plate-form, the outer edge 44 of which is spaced from the inner face of the cylindrical wall of the drum-section 1-a. I also prefer to cut back their forward radial edges so that they will present inclined edges 45. This facilitates circulation of the liquid from the secondary impeller 11 back into the spaces between the vanes 40 as indicated by the arrows in Fig. 1. This liquid should fill both sections of the drum 1 up to the level indicated by the dotted line 46.

In order to enable the baffle ring 43 to operate as a brace for the vanes, contact points may be welded; and the edges of the vanes may be formed with notches 47, that fit to the cross-section of the ring.

The secondary impeller 11 preferably has a plurality of equidistant long vanes 48 (see Fig. 4) that are welded or otherwise secured to the sleeve 12 at their inner ends, with their outer edges 49 lying near to, but not touching the peripheral wall of the drum section 1-a. It also has a considerable number of short vanes 50 spaced intermediately between the long vanes, and whose outer edges 49-a are in circumferential alignment with the edges 49 of the long vanes. This impeller 11 also has a ring form baffle 51 similar to the baffle 43 and attached in the same way to its long vanes and short vanes.

When the drive shaft starts to rotate the drum 1, the primary impeller 5 rotates with the drum, and the liquid between this impeller's vanes is forced outwardly by centrifugal force, and develops swirls around the portions of the baffle ring lying between the vanes. As the liquid moves outward between the vanes 40 reduction in pressure develops in the space adjacent to the central portion of this impeller, and this causes liquid near the central portion of the secondary impeller to flow rearwardly and into the inner spaces of the primary impeller. This interaction of these two impellers, causes the secondary impeller 11 to rotate in the same direction as the primary impeller, thereby causing the sun-gear on sleeve 12 to rotate in the same direction as the drum. This rotates the spider 17 in the same direction, and as the spider 17 is keyed to the shaft extension 15b by key 17a (see Fig. 1) a starting torque is imparted to driven shaft 15.

As the R. P. M. speed of the primary impeller increases so does that of the secondary impeller or runner 11, and also the speed of the runner 52, until finally all three of these parts (rotors) rotate at approximately the same speed. The third rotor, -runner, 52 is keyed to driven shaft 15, and rotates with the two impellers as described, and when the planetary gears substantially cease rotating on their axes, their teeth at their outer edges will then exert a considerable thrust in a circumferential direction, that is, in the same direction as the drive is taking place. While the speed of rotation of the sun-gear and the planetary carrier is accelerating, the vanes on the two impellers and on the third rotor or runner 52, cause the liquid in the drum to rotate at a high velocity, that is, substantially the same as the velocity of rotation of the three rotors.

The momentum of this moving mass of operating liquid tends to equalize the speed of rotation of these three rotors and is an important factor in accelerating the drive up to the one-to-one ratio. This will free ring 20 and cause the brake disc 22 to rotate clockwise, as viewed in Fig. 2. As the thread 37 is a right hand thread, the pressure of the brake lining 28 against the traveller disc causes the traveller to back away from the brake disc, and enables the brake disc and the ring to turn freely. The liquid in the drum sections is, of course, an oil, which will lubricate the contacting faces of the brake lining and the traveller disc so that only slight wear on the lining will occur.

I prefer to employ the third impeller or runner 52 the construction of which, as indicated, may be substantially the same as that of the impeller 11, with long and short vanes, and a baffle 53. The hub of this impeller, however, has a driving connection to the driven-shaft 15 by any suitable means, such as a key 54. On its right side, as viewed in Fig. 1, this third rotor, or runner, receives the swirls of liquid that are projected into it from the secondary impeller.

The oil chambers of the two drum sections 1-a and 1-b are in communication to enable the section 1-b to keep the gears in it running in oil at all times. This can be accomplished by making sufficient clearance at the opening 55 where the shaft 15 passes through the partition wall 4.

Suitable ball bearings 56, 56-a and 57 are provided for the shafting at the ends of the apparatus. The outer raceway 58 for the latter fits tight in a sleeve 59 that may be formed integrally with the head 60 of the drum section 1-b.

Each drum section is provided with its own filling opening and drain orifice closed by a threaded plug 61.

A liquid seal 62 is provided in the bore of the sleeve 59. The third impeller 52, of course, adds the torque it develops, as a booster for the torque exerted on the driven-shaft by the spider 17. One advantage effected in the employment of this booster is that it aids in giving increased momentum to the horizontal refluent currents of oil that move to the right near the sleeve 12 and toward the nave portion of the primary impeller 5.

Referring again to the mode of operation of this transmission, it has been described how the drive when started up will begin as a reduction drive effected through the planetary gears and the spider 17 to the driven-shaft 15 until the thrust direction of the planetary gears at the ring 20 reverses, whereupon a substantially one to one drive ratio will take over. If at any time the power drive imparted to the drum, drops below that which is necessary to maintain it, for example, in ascending a steep grade in an automobile, then the one to one drive will falter and will be replaced automatically by the reduction drive through the planetary gears, rotating on their own axis in transmitting the torque to the spider 17 and the driven-shaft.

When this transmission is employed in an automobile or truck, a conventional reversing gear mechanism may be employed between the rear end of shaft 15 and the differential of the car. In forward driving the reversing mechanism would be set to transmit the forward driving torque to the differential. When necessary to back the car under its own power, the reversing gear should be thrown into action by its control lever.

By reason of the fact that the thread 37 is high-pitch thread, the pressure of the spring 39 against the back of the traveller disc 27 biases the traveller normally at all times into engagement with the brake lining 28. If this thread were not of sufficiently high-pitch, the spring could not return the traveller disc against the lining 28 after it had been moved away from it by the brake disc when the drive would pass from a reduced drive ratio to a one-to-one drive ratio.

What I claim is:

1. In a hydraulic variable-ratio transmission, the combination of a power-driven driving shaft, a rotary cylindrical drum mounted for rotation on its axis and connected to the driving shaft for rotation thereby, said drum having a chamber for carrying a mass of liquid therein extending out to the peripheral wall of said drum and substantially filled with a mass of operating liquid, impeller vanes carried by said rotary drum projecting into the said chamber for rotating the fluid therein in the driving direction, a secondary impeller mounted for rotation within the drum alongside the path of movement of said impeller vanes and having its own impeller vanes extending in a general radial direction for receiving liquid projected upon them by the first named vanes, a tubular shaft for said secondary impeller, a sun-gear driven thereby, a runner rotatably mounted within the drum and alongside the secondary impeller, on the axis of said drum, having vanes extending in a general radial direction thereon, rotated by the liquid projected upon its vanes by the secondary impeller, a driven shaft mounted within said tubular shaft and connected to said runner, a planetary-gear carrier mounted on said driven shaft and rotating therewith, a plurality of planetary gears carried on the said gear carrier meshing with the said sun-gear, a reactor gear having gear teeth meshing with said planetary gears, means for normally holding said reactor gear fixed against rotation, and automatic means for releasing said reactor gear to permit its free rotation when the planetary gear carrier and the sun-gear are rotating at substantially the same speed, thereby establishing a substantially one-to-one drive ratio from the driving shaft to the driven shaft.

2. A hydraulic variable-ratio transmission according to claim 1, wherein the means for normally holding said reactor against rotation comprises a brake-disk attached to the side of the reactor gear, a traveler disk having a face lying against the face of the brake-disk and functioning initially in the transmission operation to hold the brake-disk and reactor gear against rotation, said traveler disk having a co-axial hub with a high-pitch thread thereon, a coil spring normally pressing the traveler disk against the brake-disk, a supporting member for the said hub having a high-pitch thread meshing with the first named thread; said disks and said spring cooperating when the speed of rotation of the sun-gear and gear-carrier become equalized, to enable the thrust of the planetary gears to rotate the brake-disk and traveler disk on its thread connection in a direction to withdraw the traveler disk from the brake-disk.

3. A hydraulic variable-ratio transmission according to claim 1 in which the said drum includes a transverse head on which its vanes are carried and extend in a general radial direction, and in which the said vanes of the drum head carry an annular baffle at the edges of the same that lie adjacent to the secondary impeller, the outer edge of said baffle being spaced from the peripheral wall of said casing so as to permit and promote forming a transverse swirl of the liquid medium against the secondary impeller adjacent to its periphery, and circulating around the adjacent portion of the baffle.

4. A hydraulic variable-ratio transmission according to claim 1 in which the secondary impeller includes an annuler baffle carried by it on its side adjacent to the third impeller or runner, the outer edge of said last named baffle being spaced from the peripheral wall of the drum.

5. In a hydraulic variable-ratio transmission, the combination of a substantially cylindrical closed casing for carrying a driving liquid, and having a forward transverse head, a bearing for the casing adjacent said forward head, said casing having a rear transverse head, and a partition wall constituting a transverse head separating the casing into an impeller chamber and a gear chamber, a driven shaft co-axial with said casing having its forward end located adjacent to said forward head, a bearing for the rear transverse head co-axial with said driven shaft, a spider secured on the driven shaft within the gear chamber, planetary gears carried thereby, a sun-gear rotatably mounted on the driven shaft, meshing with said planetary gears and having a sleeve extending along said driven shaft towards said first named transverse head, a primary impeller with impeller blades rigid with the casing extending in a general radial direction and toward the first named transverse head, means for rotating the said casing, a secondary impeller having blades extending in a general radial direction, and mounted for rotation about the axis of the driven shaft, and driven by the operating liquid impelled into the same by the primary impeller; said secondary impeller being connected with said sleeve for impelling the sun-gear; a runner between the secondary impeller and the forward transverse head with means connecting the same to the driven shaft for impelling it, and actuated by the operating liquid driven into the runner by the secondary impeller; a reactor internal gear meshing with the planetary gears, means for supporting the internal gear for co-axial rotation about the driven shaft; said internal gear having a brake-element attached for rotation therewith, a movable brake-element co-operating with the first named brake-element to hold the internal gear substantially stationary when the forward drive starts, to drive the driven shaft at a reduced ratio while the torque exerted by the planetary gears against the internal gear is reversed in direction with respect to the forward driving direction; and means activated by the arrival of the drive at a substantially one-to-one ratio, for moving said movable brake-element to release said internal gear and permit its free rotation with the spider and driven shaft at substantially a one-to-one ratio.

References Cited in the file of this patent

UNITED STATES PATENTS

| Number | Name | Date |
|---|---|---|
| 2,000,959 | Jimmerson | May 14, 1935 |
| 2,152,113 | Van Lammeren | Mar. 28, 1939 |
| 2,260,015 | Fichtner | Oct. 21, 1941 |
| 2,284,123 | Breer | May 26, 1942 |
| 2,316,390 | Biermann | Apr. 13, 1943 |
| 2,350,810 | Pentz | June 6, 1944 |
| 2,388,062 | Keller | Oct. 30, 1945 |
| 2,548,272 | Seybold | Apr. 10, 1951 |